US005211309A

United States Patent [19]

Crook

[11] Patent Number: 5,211,309

[45] Date of Patent: May 18, 1993

[54] CONTROLLED CONTAINMENT SYSTEM FOR BOTTLED BEVERAGE VENDING MACHINES

[75] Inventor: Richard D. Crook, Cypress, Tex.

[73] Assignees: FAB Design Concepts, Inc.; Nutrivend, Inc., both of Houston, Tex. ; a part interest

[21] Appl. No.: 889,987

[22] Filed: May 29, 1992

[51] Int. Cl.[5] ............ B65G 59/06

[52] U.S. Cl. ............ 221/67; 221/124; 221/312 B; 414/923

[58] Field of Search ............ 221/67, 123, 124, 188, 221/189, 191, 251, 258, 312 B; 414/923, 795.6; 211/59.2, 59.4, 74

[56] References Cited

U.S. PATENT DOCUMENTS

| | | | |
|---|---|---|---|
| 2,743,037 | 4/1956 | Manczuk | 221/67 |
| 3,338,470 | 8/1967 | Newberry | 221/67 |
| 4,821,919 | 4/1989 | Smith . | |
| 4,940,161 | 7/1990 | Hieb | 221/67 |
| 5,060,810 | 10/1991 | Jones | 211/59.4 |

*Primary Examiner*—Joseph E. Valenza

*Assistant Examiner*—Dean A. Reichard

*Attorney, Agent, or Firm*—Jacobson, Price, Holman & Stern

[57] ABSTRACT

A bottled beverage vending machine storage column modified by including a controlled containment system to dispense irregularly shaped bottles having spherical surface areas from a dispenser tray at the bottom of the column for discharge of the bottled beverages from a collection door without damage to the bottles. The controlled containment system includes a pair of opposed bottle neck guide tracks, one of which is adjustable in width to provide for temporary holding of the bottles in suspension and the other of which includes removable and telescopic segments, to keep the bottles from turning sideways when the bottles are stacked alternately, neck to bottom in a stack. The structure keeps the bottles from "nose-diving" thus allowing the stack of bottles to move smoothly downwardly while in a horizontal position and to drop into the dispenser tray which includes leveling spacers to keep the bottles level in the dispenser tray for discharge into a collection door or other discharge point on the vending machine.

18 Claims, 6 Drawing Sheets

CONTROLLED CONTAINMENT SYSTEM FOR BOTTLED BEVERAGE VENDING MACHINES

BACKGROUND OF THE INVENTION

1. Field of the Invention

The present invention generally relates to vending machines for dispensing bottled beverages and more specifically to a controlled containment system incorporated into existing vertical columns in which bottles are stacked for discharge to enable irregularly shaped bottles to be stacked in and moved from a vertical storage dispenser column into a dispenser tray at the bottom of the column for discharge of the bottled beverages from a collection door without damage to the bottles. The controlled containment system includes a pair of opposed bottle neck guide tracks to keep the bottles from turning sideways when the bottles are stacked alternately, neck to bottom in a stack. The structure keep the bottles from "nose-diving" thus allowing the stack of bottles to move smoothly downwardly while in a horizontal position to drop into the dispenser tray which includes leveling disks to keep the bottles level in the dispenser tray for discharge into a collection door or other discharge point on the vending machine.

2. Description of the Prior Art

Present commercially available vending machines for dispensing bottled drinks or beverages cannot effectively dispense certain types of commercially available bottled beverages or drinks. Certain bottles containing beverages or drinks are irregular in shape. One such bottle is that used to bottle mineral water sold under the trademark "PERRIER". This type of bottle includes a tapered neck and a body portion that is continuously and sperically curved from a flat bottom to the tapered neck with the longitudinal sectional configuration of the wall of the major body portion of the bottle being continuously curved from the flat bottom to the tapered neck with the outer surface of the bottle being convex and the inner surface of the bottle being concave. The bottles, because of their shape, tend to nose-dive and do not stack one on top of the other in a horizontal position which is necessary to stack the bottles in a vertical column for smooth dispensing. When a bottle nose-dives, the neck can become trapped in the rotatable dispensing tray thus causing jamming and stalling of the dispenser motor and possible breakage of the bottle which renders the vending machine inoperable until the problem has been corrected.

U.S. Pat. No. 4,821,919 discloses an apparatus for stacking conical objects that are all arranged in an inclined direction with retarding means controlling downward movement of the conical members. The prior art does not disclose any structure for effectively retaining the above described irregularly shaped bottles in horizontal position in a vertical stack in a storage column of a vending machine in order for the lowermost bottle in the stack to be oriented horizontally for smooth discharge into the dispensing tray which is then rotated by the dispensing motor for discharging the lowermost bottle into a discharge chute and collection door.

SUMMARY OF THE INVENTION

An object of the present invention is to provide a controlled containment system for bottled drink or beverage vending machines to enable existing vending machines to effectively support irregularly shaped bottles in a vertical storage column in a vending machine for maintaining the bottles in a horizontal position as they move downwardly in the column in order that the lowermost bottle will enter the dispensing tray at the lower end of the storage column in a horizontal position to enable the dispensing tray to be rotated by the vending machine motor to effectively discharge the irregularly shaped bottle into the collection door so that it is accessible to the person operating the vending machine.

Another object of the invention is to provide a controlled containment system in accordance with the preceding object in which the irregularly shaped bottles are those which do not include a cylindrical surface or cylindrical surface areas which will support bottles in a horizontal stacked position such as bottles used for beverages, drinks or the like such as those sold under the trademark "PERRIER" and "CLEARLY CANADIAN" in which the major portion of the bottle is provided with a spherically curved external surface area extending from a flat bottom to a tapered neck which causes the bottles to nose-dive when placed horizontally in a vertical stack of bottles in a storage column of a vending machine.

A further object of the invention is to provide a controlled containment system in accordance with the preceding objects in which the storage column is provided with vertical bottle neck guide tracks at each vertical end edge thereof with the inner or rear guide track including a structure for varying the distance between the edges of the track which receive the bottle neck or cap in order to hold the bottles in temporary suspension while the outer or front guide track is assembled to receive the bottle neck or cap as bottles are being loaded into the storage column.

Still another object of the invention is to provide a structure for temporary suspension of the bottles by opening and closing an adjustable bottle neck guide track in which one component of the guide track is provided with projecting pins and the other component has angled slots receiving the pins with a cam mechanism being provided to move the components of the guide track longitudinally in relation to each other thus moving the edges of the guide track toward and away from each other for engaging the bottle neck or cap when the components of the guide track are moved towards each other for temporarily holding the bottles in suspension.

A still further important object of the invention is to provide a controlled containment system in accordance with the preceding objects in which the outer or front guide track is constructed of removable and telescopic components to provide access to the storage column through the outer or front end edge thereof to enable the storage column to be filled with horizontally oriented bottles with the removable and telescopic components of the outer guide track being assembled into position for guiding the necks of the bottles which are facing outwardly with the inner adjustable guide track arrangement guiding the bottle necks which are facing inwardly when the inner adjustable guide track is opened to release the bottles from their temporary suspension.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
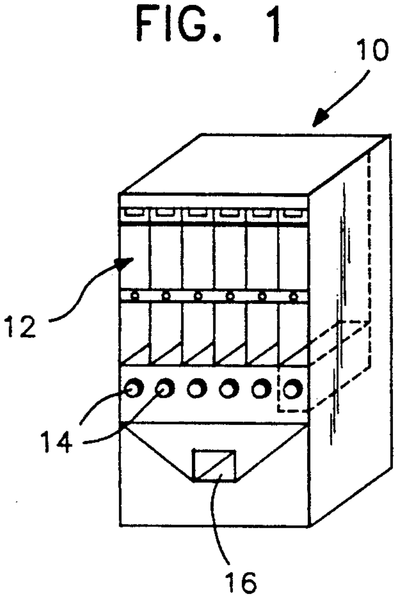
FIG. 1 is a schematic perspective view of a vending machine illustrating a plurality of storage columns and a collection door from which bottled beverages and drinks are dispensed with the controlled containment system of the present invention incorporated into any or all of the storage columns.

FIG. 1 illustrates schematically a vending machine 10 for bottled beverages or drinks with the front door removed to illustrate a plurality of vertical storage columns 12, selector buttons 14 and a collection door 16 through which a selected bottle is dispensed when appropriate coins have been deposited in the vending machine and the desired drink o bottle has been selected by actuating a selector button 14. The number of columns 12 may vary but in one commercially available vending machine, eight storage columns are provided to provide an adequate selection of bottled beverages. Normally, the beverage bottles are placed in the storage columns horizontally and vertically stacked one on the other with most bottles being used in the industry including a generally cylindrical body portion or a body portion having longitudinally spaced cylindrical areas which will support the bottles generally in horizontal position when stacked in a vertical stack. However, several beverages or drinks are bottled in irregularly shaped bottles which have generally spherically curved surfaces from a flat bottom to a tapered neck. Such bottles will nose-dive when positioned horizontally in a vertical stack of bottles which can result in dispensing mechanism becoming jammed or the bottle broken.

The controlled containment system of the present invention is disclosed as being incorporated into one of the storage columns 12 although the containment may be incorporated into any number of the columns. As illustrated in the drawings, the storage column 12 includes spaced parallel side walls 18 and 20 having their inner or rear edges interconnected by an inner end wall 22. An adjustable inner wall 21 is mounted adjustably between walls 18 and 20 by opposed spring biased lock members 23 extending outwardly into engagement with one of a plurality of holes in the walls 18 and 20 for adjustment to receive bottles of different length. The top edges of walls 18 and 20 are interconnected by a top wall 24. The outer or front edges of the walls 18 and 20 are interconnected by a partial end wall 25 and brackets interconnecting outwardly extending flanges 26 and the bottom edges of the walls are interconnected by a bottom structure 28 which includes an inclined surface 30 and a surface 32 forming a generally flat chute extending to the collection door 16 for guiding the bottles discharged to the collection door 16. A generally semi-cylindrical dispensing tray 34 with circular ends 35 is mounted horizontally at the bottom of the storage column 12 for rotation about support pins 36 with one of the support pins forming a shaft connected to the vending machine motor which rotates the shaft and the tray 34 to discharge the lowermost bottle from the storage column 12 onto the chute surfaces 30 and 32 and into the collection door 16 for access by the customer. The above described structure of the column 12 is conventional and well known in present vending machines.

Figure 4:
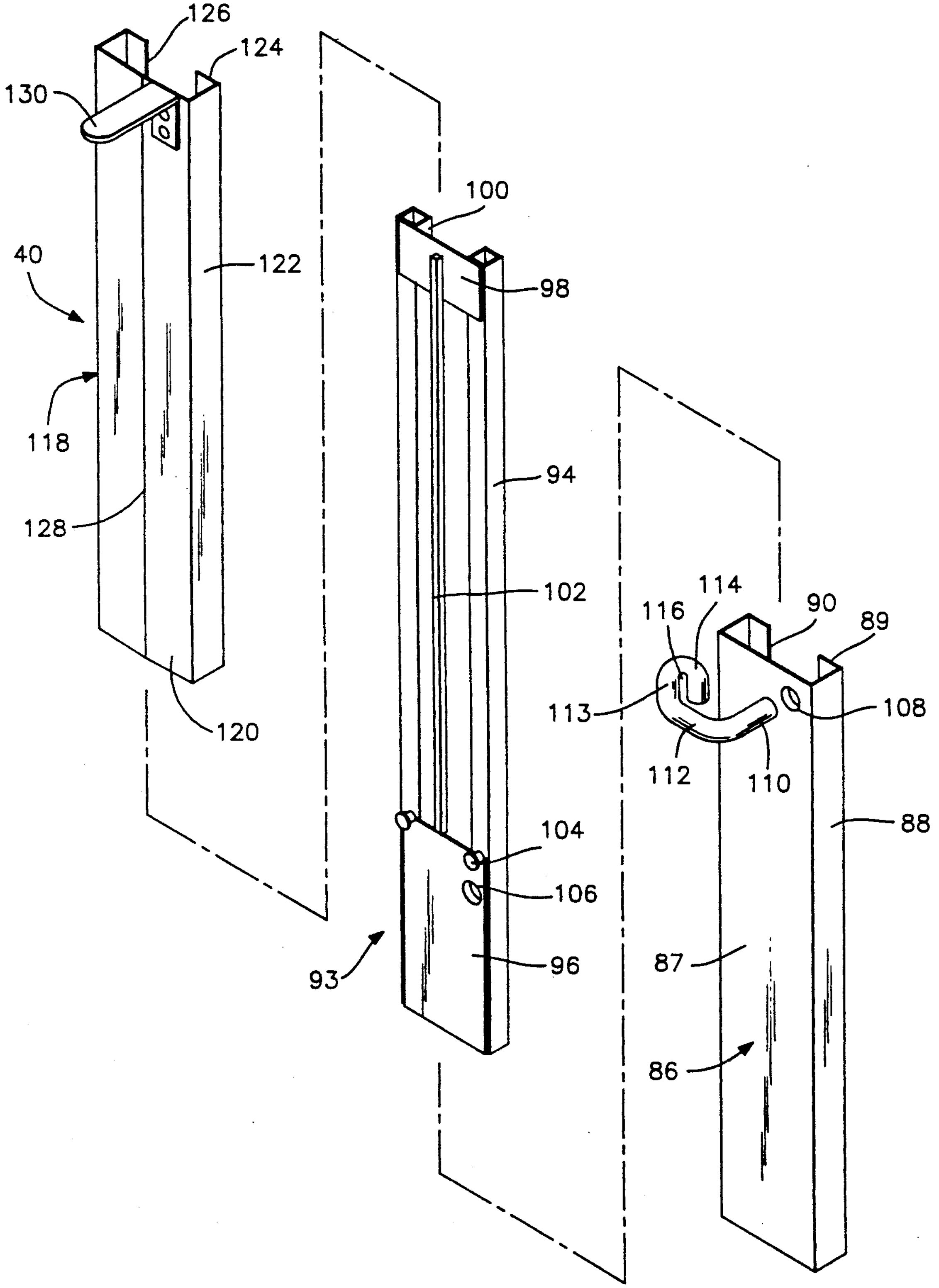
FIG. 4 is an exploded group perspective view of the components which form the front or outer guide track for the bottle necks which face outwardly of the storage column.

The storage column 12 is provided with an inner or rear guide track generally designated by reference numeral 38 and an outer or front guide track assembly generally designated by reference numeral 40 as illustrated in FIG. 4. The inner or rear guide track 38 includes a lower stationary track 42 of generally channel-shaped configuration which is rigidly affixed to the adjustable inner end wall 21 of column 12 and includes an end wall or web 44 with short perpendicular edge walls 46 terminating in inturned flanges 48 spaced from the wall 44 and defining opposed vertical guide edges 50 defining a guide track for receiving the reduced neck and cap 52 on a bottle 54 that is irregularly shaped and provided with a flat bottom 56 and a spherical curved body portion 58 when the bottles 54 are stacked in the column in horizontal position and alternately neck to bottom. The inner guide track 38 also includes an upper guide track 60 which includes a stationary end wall or web 61 secured to end wall 21 and forming an extension and continuation of the wall 44, one edge wall 62 forming a continuation of one edge flange 46 and an inturned flange 63 forming a continuation of flange 48 of lower stationary track 42. The inner edge 64 of the flange 63 forms a continuation of one of the track edges 50 in the lower stationary track 42.

The upper track 60 also includes a laterally adjustable track 65 including an end wall 66 which overlies and engages end wall 61, an edge wall 68 perpendicular to the outer edge of wall 66 and an inturned flange 70 in opposed relation to the flange 63 with the flange 70 including an inner edge 72 which moves toward and away from the edge 64 on the flange 63 in a manner described hereinafter. Thus, the adjustable and laterally movable track 65 in its open position forms an extension of the flange 48 and inner edge 50 on the lower stationary track 42 but when it moves inwardly, the entire movable track 65 moves towards the flange 63 and wall 62 on the stationary upper track 60. To move the adjustable track 65, a plurality of longitudinally inclined slots 74 are formed in the end wall 66 to receive projecting pins 76 having large flat heads 77 which are rigid with the wall 61 of the stationary track 60 so that when the track 65 is moved longitudinally, the track 65 will move towards and away from the track 60 thus providing an adjustable upper guide track formed by flange edges 64 and 72.

The mechanism for moving the track 65 longitudinally includes a cam 78 which is rotatably supported at the upper end of stationary track 60 with the cam 78 engaged between vertically spaced flanges 80 and 81 on the upper end of the movable track 65 to move it vertically upon rotation or arcuate movement of the cam 78. The cam 78 is mounted on an elongated operating shaft 82 that is rotatably supported at its inner end from inner end wall 21 and which extends from the outer vertical end edge of the column 12 where it is rotatably supported by an upper bracket 83 interconnecting flanges 26. The shaft 82 is provided with a socket 84 on its outer end by which a key or other manual tool can be inserted to rotate the shaft for rotating the cam thus raising or lowering the adjustable track 65 to decrease or increase the distance between the edge 72 on the movable track 65 and the edge 64 on the stationary track 60 thus bringing the opposed edges into engagement with the reduced neck or cap 52 of the bottles having their neck and caps disposed inwardly. This provides for a temporary suspension of the bottles 54 for a purpose described hereinafter.

Figure 5:
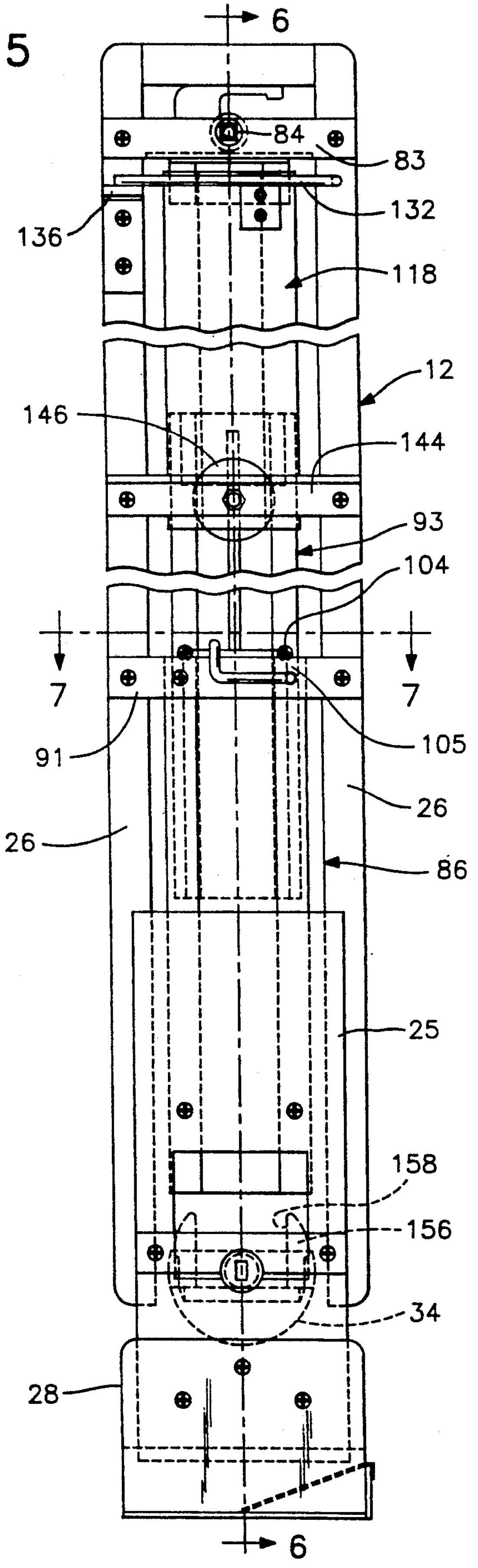
FIG. 5 is a front end elevational view of a storage column with the modifications of the present invention incorporated therein.
Figure 6A:
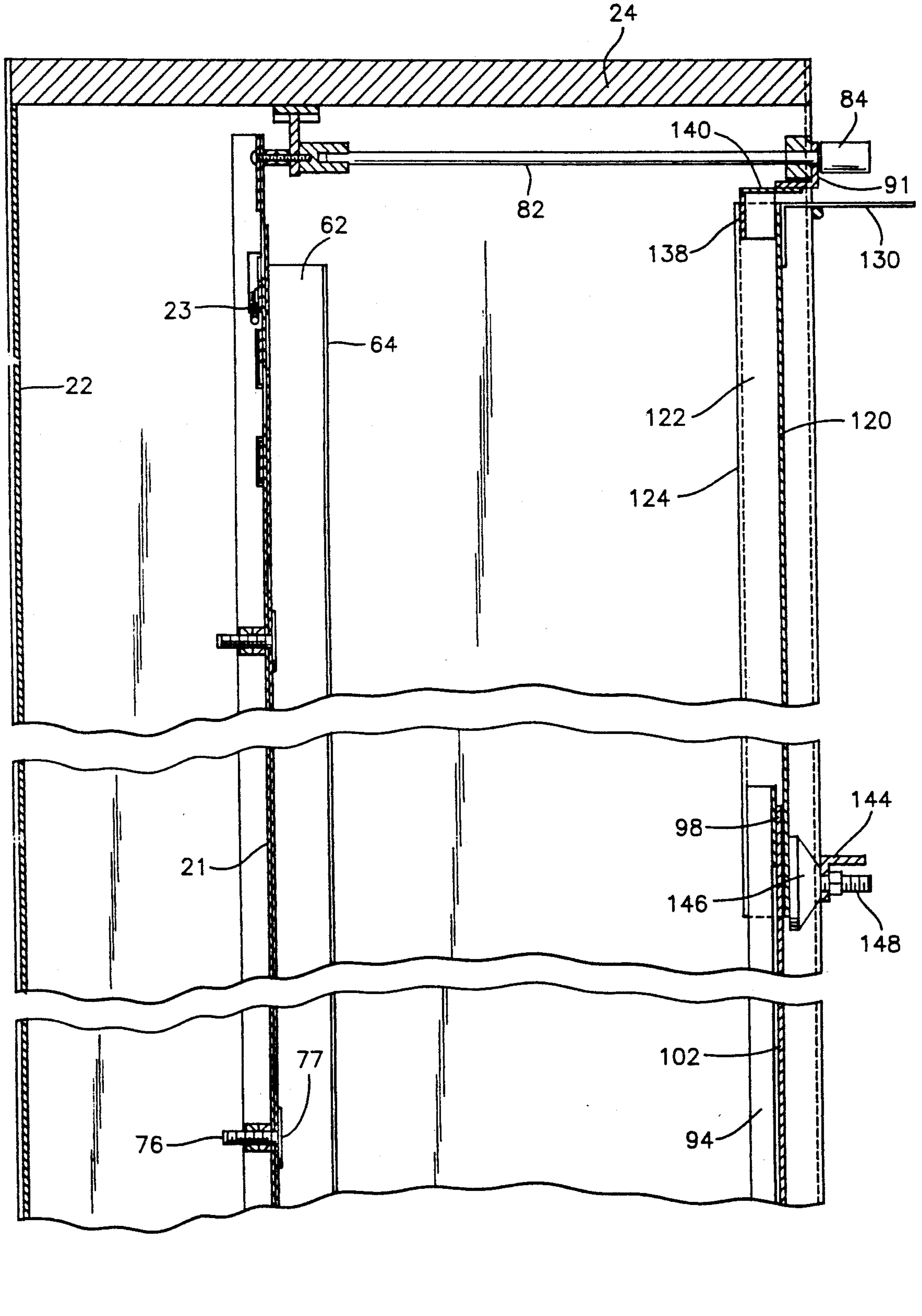
FIG. 6A and 6B are vertical sectional views, on an enlarged scale, taken along section line 6—6 on FIG. 5.
Figure 6B:
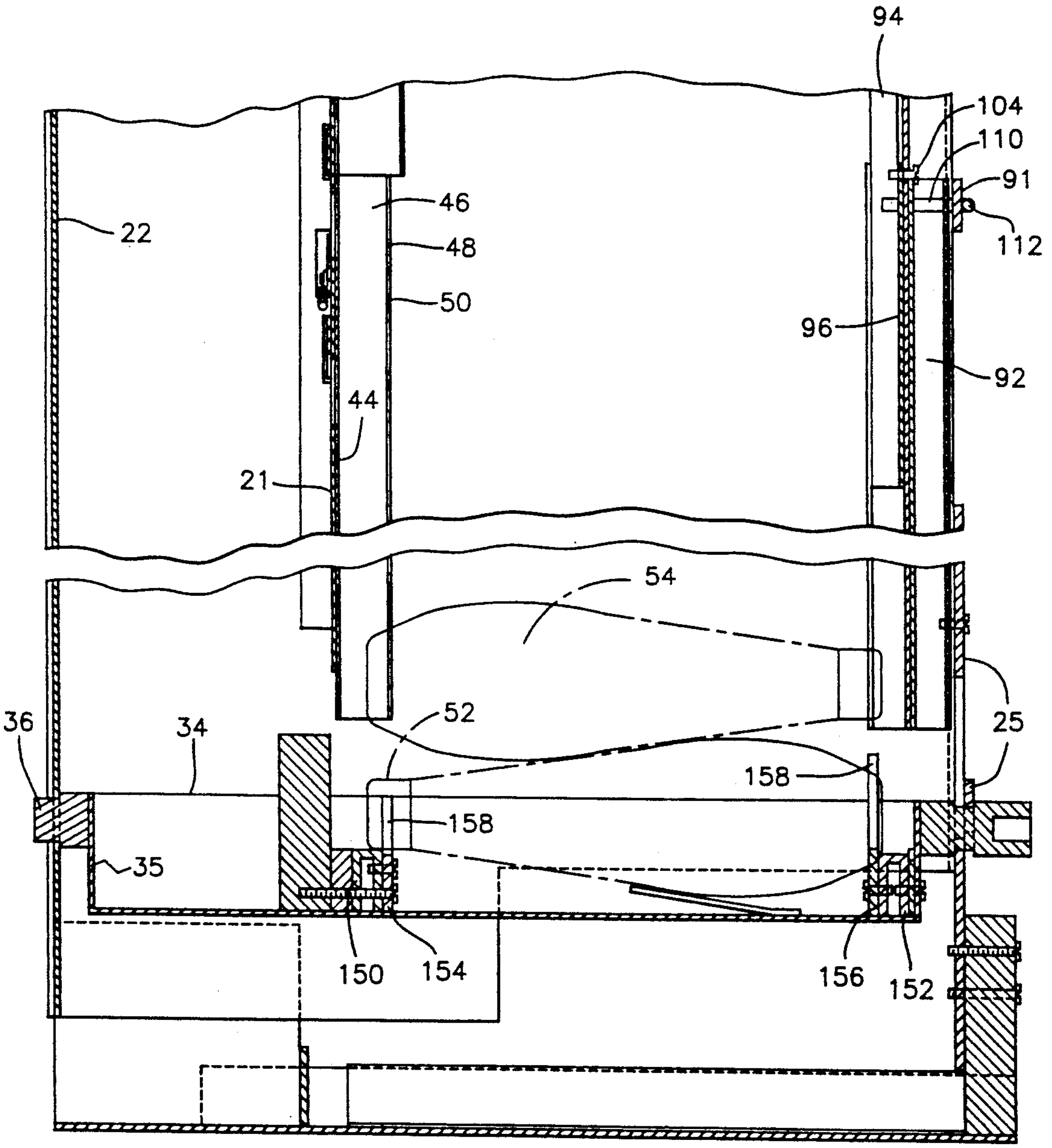
Figure 7:
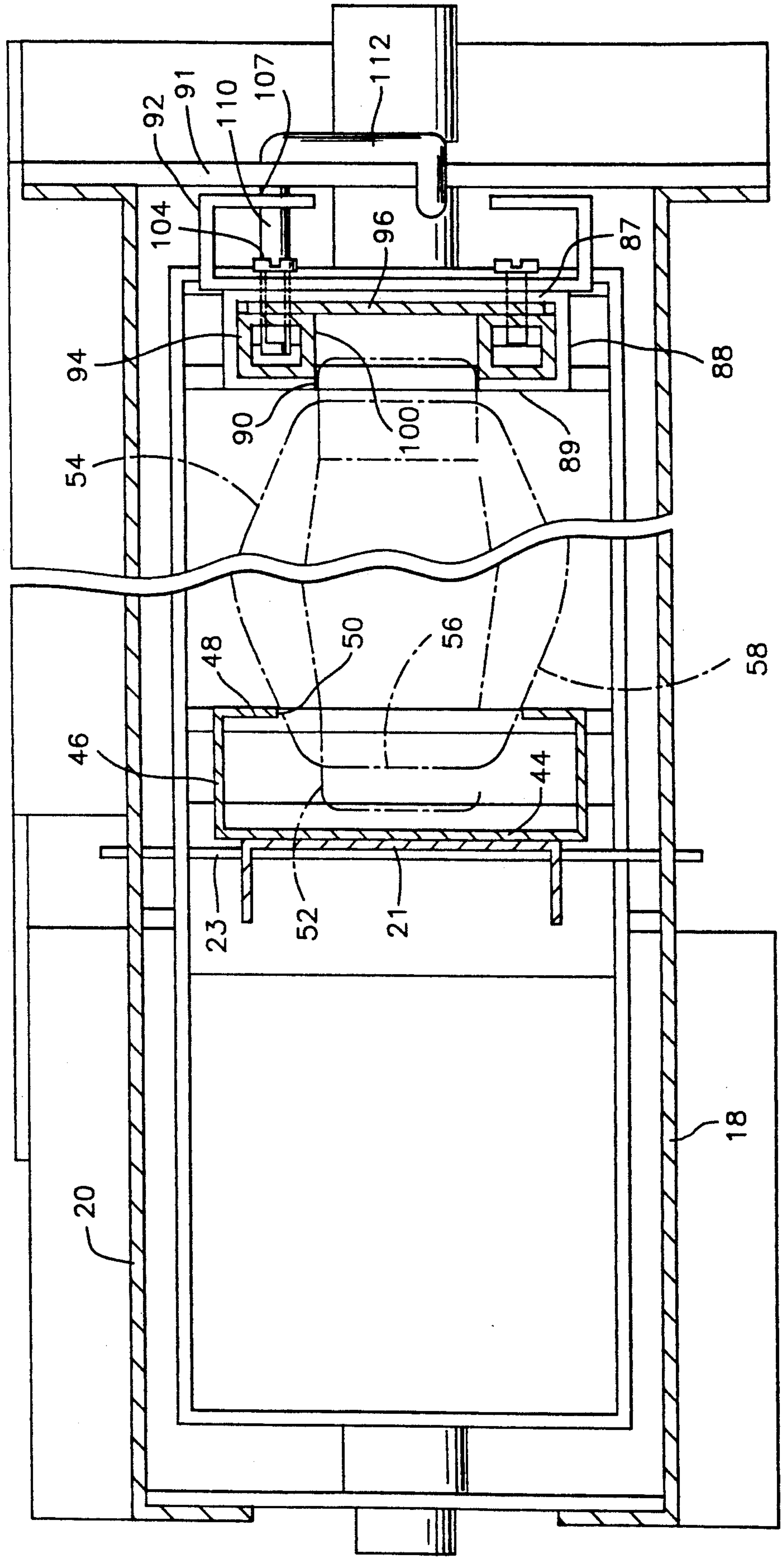
FIG. 7 is a horizontal sectional view, on an enlarged scale, taken along section line 7—7 on FIG. 5.

In opposed relation to the inner or rear guide track 38 is the front or outer guide track 40 as illustrated in FIG. 5 which includes a lower track segment 86 of channel-shaped configuration and including an outer wall 87 having relatively short edge walls 88 extending therefrom in perpendicular relation with the walls 88 terminating in inturned flanges 89 having spaced opposed edges 90 which define stationary edges for receiving the reduced neck and cap 52 of the bottles 54. The channel-shaped lower track segment 86 is rigidly affixed to the storage column 12 by a transverse lower end bracket 91 and lower partial vertical outer end wall 25 connected with the flanges 26. A vertical spacer 92 of channel-shaped configuration opposite to that of lower track segment 86 spaces the track segment 86 inwardly from the end wall 25 and the lower end bracket 91. Telescopically and slidably received in the channel-shaped track segment 86 is an intermediate track segment 93 which includes a pair of spaced parallel side members 94 of square tubular construction which are rigidly interconnected at their lower ends by a plate 96 which interconnects the outer surfaces thereof. The tubular members 94 are rigidly interconnected at their upper ends by a plate 98 rigidly secured to the outer surfaces thereof. The inwardly facing surfaces of the tubular side members 94 are parallel to each other and define inwardly facing surface in opposed relation designated by reference numeral 100 which will receive the neck 52 of the bottles 54 with the surfaces forming a continuation of the edges 90 on lower track segment 86. The outer surface of the intermediate segment 93 is provided with a rod or bar 102 which interconnects the plates 96 and 98 and is welded thereto. The upper edge of the lower plate 96 is provided with a pair of projecting headed pins or studs 104 which are on the opposite surface of the plate 96 from the members 94. The headed pins or studs 104 limit the telescopic insertion of the intermediate track segment 93 into the lower stationary track segment 86 by engaging the top edge of the outer wall 87 of the stationary track segment 86 when the lower end of the intermediate track 93 is telescoped into the channel-shaped construction of the lower stationary track segment 86 thus limiting the telescopic insertion of the intermediate track segment 93 into the lower stationary track segment 86. However, the headed pins or studs will not prevent the intermediate track segment 93 from being lifted out of the stationary lower track segment 86.

A structure is provided to releasably secure the intermediate track segment 93 with the lower end telescoped into the lower track segment 86. This structure includes an aperture 106 through the plate 96 and on of the members 94 and an aperture 108 in the upper end of wall 87 as well as an aperture 105 in the end bracket 91 and an aperture 107 in spacer 92 to receive a lock pin 110 when the aperture 106 is lowered to a position in alignment with the apertures 105, 107 and 108 with the pin 110 then being extended through the aligned apertures. The pin 110 includes a laterally extending portion 112 which is positioned alongside the outer surface of the end bracket 91 when the pin 110 is inserted into the apertures. The end of the transversely extending portion 112 of the pin is provided with an upwardly extending end portion 113 which terminates in a downwardly extending end 114 spaced from portion 113 and extending below portion 112 to form a downwardly opening groove or slot 116 which will be positioned over and will receive the top edge of the end bracket 91 when the pin 110 is inserted in the apertures 105, 107, 108 and 106 with the portion 112 of the pin then being generally vertically disposed with the pin then being pivoted downwardly to engage the downwardly opening groove 116 over the top edge of the end bracket 91 thus locking the pin 110 from being retracted from the aligned holes until the pin is pivoted upwardly about the axis of the pin 110 to disengage the generally hook-shaped end from the top edge of the end bracket 91 thus enabling the pin to be removed from the aligned holes and enabling the intermediate track segment 93 to be separated from the lower stationary track segment 86.

The outer guide track 40 also includes an upper track segment 118 which is generally a channel-shaped member including an outer wall 120 having short side edge walls 122 integral therewith and extending perpendicularly therefrom with the side walls 122 including inturned flanges 124 in opposed relation to each other in which the flanges include vertical guide edges 126 which are in opposed spaced relation to each other to receive the neck and cap 52 of bottles 54 with the edges 126 forming continuations of and being in alignment with the guide surfaces 100 of the intermediate track segment 93 and edges 90 of the lower track segment 86. The wall 120 is not completely flat in that it includes a central outwardly displaced ridge 128 defined by a pair of angled portions which form a very shallow angle to receive the bar 102 interiorly of the wall 120 when the channel-shaped upper track segment 118 is telescoped over the intermediate track segment 93. The vertical telescopic movement of the track segment 118 in relation to the track segment 93 enables the upper track segment 118 to telescope completely downwardly on the intermediate track segment 93 until the lower edge of the wall 120 engages the pins 104 at which time the upper edge of the upper track segment 118 will be in alignment with the top edge of the intermediate track segment 93 thus providing access to the interior of the storage column to facilitate loading of bottles into the storage column when a predetermined number of bottles remain in the storage column. For example, if the bottles remaining in the storage column are stacked to a position at or slightly below the top edge of the intermediate segment 93, the upper track segment 118 can be lowered completely to expose the portion of the storage column above the top edges of the intermediate track segment 93 and the lowered upper segment 118 thereby enabling the bottles to be placed in the storage column in a neck to bottom alternate relation.

In order to raise and lower the upper track segment 118, a laterally extending tab or handle 130 is provided at the upper edge of wall 120. The handle 130 also operates in combination with a pivoted lock lever 132 at the upper end of the column 12. The lock lever 132 is a rigid rod or wire having one laterally extending end 134 pivotally extending through and connected to one flange 26 and the other end is positioned in overlying relation to a laterally extending ledge 136 on the outer flange 26 on the opposite wall of the storage column 12. The lever 132 is in the form of a metal rod having the pivoted end 134 extending through an aperture in the flange 26 with sufficient looseness to enable the free end of the lever 132 to be positioned on top of the flange or ledge 136 which may have a slightly upturned end edge to retain the lock lever in position in underlying relation to the handle tab 130 thus releasably retaining the upper track segment 118 in its elevated operational position. The upper end of upper track segment 118 telescopes over a short guide 138 which is duplicative of the shape of the upper end of the intermediate track segment 93 and depends from and is rigid with an inwardly extending flange 140 on bracket 91 and includes two tubular side members 142 interconnected by a plate 143 interconnecting the inner surfaces thereof. Once the bottles have been placed in the storage column, the upper track segment 118 can be lifted and locked in its elevated position thus forming two continuous guide tracks one at the inner end and one at the outer end of the storage column.

When the remaining supply of bottles 54 in the storage column 12 is substantially below the top edge of the intermediate segment 93 which can be determined by lowering the upper track segment 118, the telescoped upper segment 118 and the intermediate segment 93 can be removed by removing the pin 110 and grasping the upper edges of the intermediate segment 93 and the upper segment 118 and lifting them upwardly to separate the intermediate segment 93 from the stationary lower segment 86 thereby providing access to the lower end portion of the storage column in order to place bottles therein in a neck to bottom alternate relationship.

Figure 2:
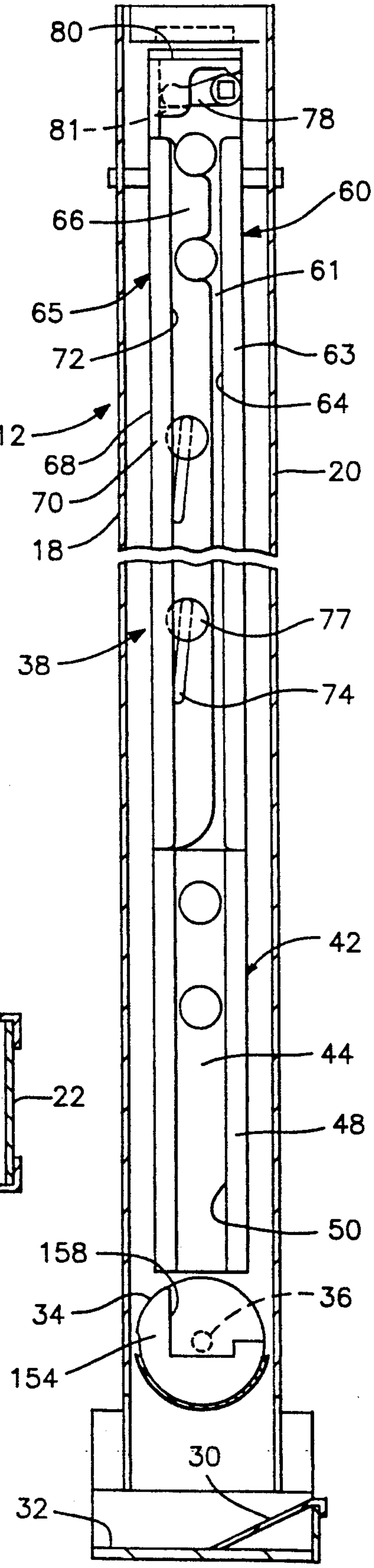
FIG. 2 is a vertical sectional view through a storage column in the direction of the inner or rear guide track for the bottle necks which are facing inwardly and illustrating the structure of the adjustment mechanism.
Figure 3:
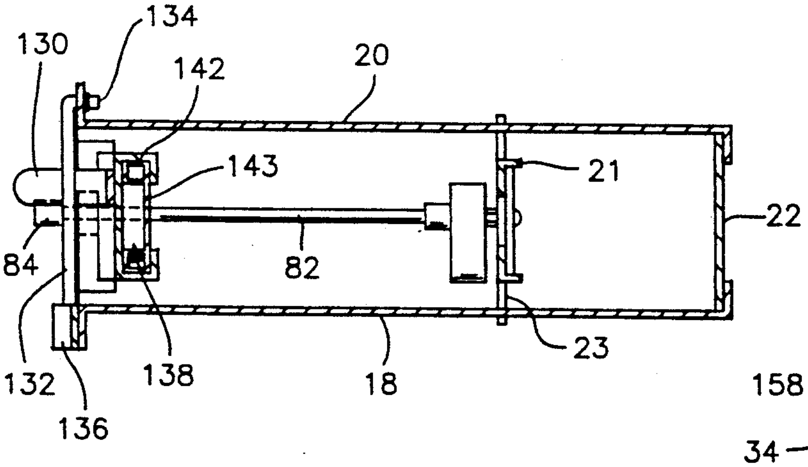
FIG. 3 is a transverse, sectional view at the upper end of the storage column.

In order to fully load the open portion of the dispenser storage column above the dispensing tray 34, the bottles are held in temporary suspension until the outer retaining intermediate track segment 93 and upper track segment 118 are placed in position to complete the outer guide track 40. The bottles are temporarily held in suspension by closing the rear bottle neck guide track 60 by moving the movable track 65 upwardly whereby the pins 76 sliding in the inclined slots 74 will move the track edge 72 towards the stationary track edge 64 on the stationary flange 63 by rotating the cam 78 to lift the flange 80 at the upper end of the adjustable track 65. As illustrated in FIG. 2, this movement causes the track slot between the inner edges of the stationary flange 63 and movable flange 70 on the adjustable track 65 to move towards each other toward a closed position. In the closed position, the bottles 54 can then be stacked on each other in alternate neck to bottom relationship by sliding the bottle neck and cap 52 downwardly from the top and behind the closed track defined by the inner edges on the flanges on the tracks 60 and 65 with the bottles coming to rest either on the dispensing tray or on top of each other in a stacked relation with the closed position of the tracks 60 and 65 of the inner guide track keeping the bottles from sliding outwardly towards the outer edge of the storage column 12 and retaining the necks of alternating bottles in vertical alignment to prevent them from moving laterally thereby keeping the bottles from coming out of the storage column or moving laterally in relation thereto until the removable outer track segments 93 and 118 are locked in place which is accomplished by telescoping the lower end of the telescoped segments 93 and 118 into the stationary lower track segment 86, locking the intermediate track segment 93 to the lower track segment 8 by inserting and locking the pin 110 and then elevating the upper track segment 118 and locking it in elevated position with the locking lever 132. After the bottles have been stacked on each other in this manner and the outer track segments 93 and 118 have been locked in place, the inner movable bottle neck guide track 65 is moved to the open position by turning bottle neck actuating cam 78 by inserting the tool into the square socket 84 on the end of the rod 82 thus moving the cam lever 78 downwardly to move the movable track 65 outwardly so that the inner edge 72 on the flange 70 is aligned with the edge 50 on the flange 48 on the lower track 42. After the outer track segments 93 and 118 are installed and the upper track segment 118 moved upwardly and latched in its upper closed position, opening of the inner movable bottle neck track 65 occurs by turning the shaft to move the cam to open the movable track 65 thus allowing free movement of the bottles in the inner and outer bottle neck guide tracks in order for the bottles to move downwardly to the dispensing tray 34 and out to the dispensed bottle collection door 16.

In order to stabilize the telescopic connection between the upper end of the intermediate track segment 93 and the lower end of the upper track segment 118 when in its uppermost position, a transverse intermediate bracket 144 rigidly interconnects flanges 26 and walls 18 and 20. A guide member 146 in the form of a circular disc or pad is adjustably mounted on the bracket 144 by the use of a mounting stud 148 on the guide member 146 which is screw threaded through the bracket 144 and provided with a lock nut to lock the pad in adjusted position to stabilize the track segments 93 and 118 when in their retaining positions and also guide movement of the upper track segment 118 when it is being raised and lowered.

The rotatable dispensing tray 34 includes a pair of insert spacers 150 and 152 in the opposite ends thereof to receive the shorter bottles 54 with spacers having inner plates 154 and 156 respectively which are aligned with the guide edges 90 and 50 respectively. The plates 154 and 156 include large radial notches 158 which receive the neck and cap end of the bottles 54 with the rounded outer ends of the notched plates assisting in separating the stacked bottles 54 with the circular edges of the plates 154 and 156 above the side edges of the tray 34 supporting the stack of bottles 54 when the tray 34 is rotated to dispense the lower most bottle.

The structure of this invention enables existing commercially available cold drink dispensing vending machines to effectively dispense irregularly shaped bottles by inserting one or more storage columns 12 which have been modified by incorporation of the present invention into the storage columns that were already provided in existing vending the machine thus adapting the vending machine to effectively dispense bottled beverages that are made commercially available in irregularly shaped bottles. The specific structure of the guide tracks including the adjustable guide track 65 in the inner or rear guide track 38 and the removable and telescopic segments 86, 93 and 118 of the outer or front guide track 40 provides for refilling the storage column with irregularly shaped bottles alternately in neck-to-bottom relationship in a vertical stack with the adjustable track 65 enabling temporary suspension of the bottles in the stack above the lower stationary track segments 42 and 86 thus effectively retaining the bottles in position until the storage column has been fully loaded and the front track segments 93 and 118 reassembled and extended to their retaining position after which the bottles in the stack are released for dispensing by the rotation of the dispensing tray 34 by the dispensing motor in a manner well known in this art.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a bottled beverage vending machine including at least one vertically oriented storage column having a rotatable dispensing tray at the lower end thereof for dispensing the lowermost bottle of a vertical stack of horizontally disposed bottles and a collection door for discharge of the bottle for access by a beverage consumer, said storage column including spaced, vertically disposed side walls, the improvement comprising an inner guide track supported between the walls and an outer guide track supported between the walls with the outer guide track being generally in alignment with the outer vertical edges of the walls of the storage column, each of said guide tracks including vertically disposed, parallel, laterally spaced, aligned flanges having parallel inwardly facing edges for receiving the necks of alternately arranged, neck-to-bottom, bottles to retain the bottle necks in substantial vertical alignment with the side walls of the storage column maintaining the bottle bottoms substantially in vertical alignment, said outer guide track including a lower stationary segment and upper removable segments to provide access to the storage column for placing bottles in the storage column, said inner guide track including a stationary lower segment in opposed facing relation to the stationary lower segment of the outer guide track with the lower stationary segments extending to a height to enable bottles to be initially placed on the dispensing tray and then stacked in a lower portion of the column from the area of the storage column above the outer stationary track segment, said inner guide track including an upper adjustable track to hold bottle necks of alternate bottles in the vertical stack in temporary suspension when placing bottles in the storage column above the stationary bottom segments when the upper segments of the outer guide track are removed to retain the bottle necks in alternate bottles in vertical alignment and means adjusting the upper track of the inner guide track between closed and open positions to release the bottle necks of alternate bottles engaged with the upper adjustable track after the upper removable segments of the outer guide track have been positioned to engage and retain the outer ends of the stacked bottles in the storage column thereby enabling free downward movement of the stacked bottles as the lowermost bottle is dispensed by the dispensing tray.

2. The vending machine as defined in claim 1 wherein the lower stationary track segment of said outer guide track is a vertically disposed channel-shaped member having inturned flanges provided with vertical, opposed edges to receive the bottle necks of alternate bottles in the storage column, said upper removable segments of said outer track including an intermediate track segment and an upper track segment, said intermediate track segment including a lower end telescopically engaged with the stationary lower segment of said outer guide track, means releasably connecting the lower end of the intermediate track segment to the upper end of the lower stationary track segment of said outer guide track, said intermediate track segment including vertical, spaced, parallel inwardly facing surfaces defining continuations of the inturned flanges edges on the lower stationary segment of said outer guide track to form a continuous guide for bottle necks of alternate bottles in the stack in the storage column, said upper track segment being of generally channel-shaped configuration for longitudinal slidable movement on the intermediate track segment, said upper track segment including inturned flanges terminating in spaced, vertical parallel aligned edges forming continuations of the vertical opposed surfaces on the intermediate track segment to receive bottle necks of alternate bottles in the vertical stack in the storage column, the length of the upper track segment being substantially the same as the intermediate track segment for telescopic movement of the upper track segment from a position forming an extension of the intermediate track segment to a position generally co-extensive with the portion of the intermediate track segment extending above the lower stationary segment of said outer guide track when assembled therewith and means releasably retaining the upper track segment in extended position when the intermediate track segment and upper track segment are assembled with respect to the lower stationary segment of said outer guide track to form the complete outer guide track extending throughout the height of the storage column.

3. The vending machine as defined in claim 2 wherein said means releasably connecting the intermediate track segment to the lower stationary segment of said outer guide track includes alignable apertures in the lower stationary segment of said outer guide track and intermediate track segment, a removable pin insertable through the aligned apertures when the intermediate track segment has been telescoped in relation to the upper end portion of the lower stationary segment of said outer guide track and means retaining the pin releasably in engagement with the aligned apertures to releasably secure the intermediate track segment to the lower stationary segment of said outer guide track.

4. The vending machine as defined in claim 3 wherein said intermediate track segment includes projecting means thereon spaced above the aperture to engage the upper edge of the lower stationary segment of said outer guide track to limit the telescopic engagement of the intermediate track segment in relation to the lower stationary segment of said outer guide track and aligning the apertures in the intermediate track segment and the lower stationary segment of said outer guide track to facilitate insertion of the pin into the aligned apertures.

5. The vending machine as defined in claim 4 wherein said means retaining the movable upper track segment in extended position forming a continuation of the guide track in the lower stationary segment of said outer guide track and intermediate track segment including a laterally extending handle at the upper edge of the upper track segment, a pivotal retaining latch mounted at a forward edge of one of said side walls and having a free end releasably engaged with a ledge on an outer front edge of the other side wall of the storage column and extending under the handle thereby releasably retaining the upper track segment in elevated position to form the outer guide track.

6. The vending machine as defined in claim 1 wherein said adjustable track of the inner track includes a vertically disposed stationary wall including an inturned flange in alignment with an inturned flange on the stationary lower segment of inner track and including an edge forming a continuation of a vertical flange edge on the stationary segment of the inner track, a movable vertical track including an inturned flange in opposed relation to the flange on the stationary wall and means interconnecting the stationary wall and movable vertical track to move the movable track toward and away from the stationary upper track.

7. The vending machine as defined in claim 6 wherein said means interconnecting the movable vertical track and the stationary wall includes a pair of projecting pins on one of said movable vertical track and said stationary wall and a pair of inclined slots in the other of said movable vertical track and said stationary wall with the pins being received in the slots whereby longitudinal movement of the movable vertical track will move the movable track toward and away from the stationary wall thereby moving the edge of the flange on the movable track towards a closed position in more closely spaced relation to the edge of the flange on the stationary wall in one direction of movement of the movable track and move the edge of the flange on the movable track away from the edge of the flange on the stationary wall in the other direction of movement of the movable track in order to hold the bottle picks of alternate bottles in the vertical stack in the storage column in temporary suspension while bottles are being placed in the storage column in alternate neck-to-bottom horizontal position above the lower stationary segments of the inner and outer tracks.

8. The vending machine as defined in claim 7 wherein said means to move the movable vertical track between open and closed positions includes a cam member rotatably mounted on one of said movable vertical track and said stationary and flanges mounted on the other of said movable vertical track and said stationary wall the upper forming the upper adjustable track to move the movable vertical track longitudinally in relation to the stationary wall upon rotation of the cam.

9. The vending machine as defined in claim 8 wherein said cam is mounted on said stationary wall and the flanges are mounted on said movable vertical track to cause the opposed edges on the flanges of the stationary wall and the movable vertical track to be moved toward and away from each other.

10. The vending machine as defined in claim 9 wherein said cam member includes a rotatable rod extending to an outer edge of said storage column and including a square area to receive a rotating tool to enable a service person to adjust the upper adjustable track between open and closed positions from the outer end of the storage column.

11. The vending machine as defined in claim 2 wherein said upper adjustable track includes a vertically disposed wall segment including an inturned flange in alignment with an inturned flange on the stationary lower segment of the inner track and including an edge forming a continuation of the vertical flange edge on the lower segment of the inner track, a movable vertical track segment including an inturned flange in opposed relation to the flange on the vertically disposed wall segment and means interconnecting the wall segment and movable vertical track segment to move the movable track segment toward and away from the wall segment.

12. The vending machine as defined in claim 11 wherein said means for releasably connecting the intermediate track segment to the lower stationary track segment includes alignable apertures in the lower stationary track segment of said outer guide track and the intermediate track segment, a removable pin insertable through the aligned apertures when the intermediate track segment has been telescoped in relation to the upper end portion of the lower stationary track segment of said outer guide track and means retaining the pin releasably in engagement with the aligned apertures to releasably secure the intermediate track segment to the lower stationary track segment of said outer guide track.

13. The vending machine as defined in claim 12 wherein said intermediate track segment includes projecting means thereon spaced above the aperture to engage the upper edge of the lower stationary track segment of said outer guide track to limit the telescopic engagement of the intermediate track segment in relation to the lower track segment of said outer guide track and aligning the apertures in the intermediate track segment and the lower track segment of said outer guide track to facilitate insertion of the pin into the aligned apertures.

14. The vending machine as defined in claim 13 wherein said means retaining the upper track segment in extended position forming a continuation of the track guide in the lower stationary segment of said outer guide track and intermediate track segment including a laterally extending handle at the upper edge of the upper track segment, a pivotal retaining latch mounted at a forward edge of one of said side walls and having a free end releasably engaged with a ledge on an outer front edge of the other side wall of the storage column and extending under the handle thereby releasably retaining the upper track segment in elevated position to form the outer guide track.

15. The vending machine as defined in claim 14 wherein said means interconnecting the upper track segment and the wall segment includes a pair of projecting pins on one of said wall segment and said movable vertical track segment and a pair of inclined slots in the other of said wall segment and said movable vertical track segment with the pins being received in the slots whereby longitudinal movement of the movable vertical track segment will move the movable vertical track segment toward and away from the wall segment thereby moving the edge of the flange on the movable vertical track segment towards a closed position in more closely spaced relation to the edge of the flange on the wall segment in one direction of movement of the movable vertical track segment and move the edge of the flange on the movable vertical track segment away from the edge of the flange on the wall segment in the other direction of movement of movement of the movable vertical track segment in order to hold the bottle necks of alternate bottles in the vertical stack in the storage column in temporary suspension while bottles are being placed in the storage column in alternate neck-to-bottom horizontal position above the lower stationary segments of the inner and outer tracks.

16. The vending machine as defined in claim 15 wherein said means to move the movable vertical track segment between open and closed positions includes a cam member rotatably mounted on one of said wall segment and said movable vertical track segment forming the upper adjustment track segment and flange mounted on the other of said wall segment and said movable vertical track segment forming the upper adjustable track to move the movable vertical track segment longitudinally in relation to the wall segment upon rotation of the cam.

17. The vending machine as defined in claim 16 wherein said cam is mounted on said wall segment of the upper adjustable track and the flange is mounted on said vertical movable track segment to cause the opposed edges on the flanges of the wall segment and the movable vertical track segment to be moved toward and away from each other.

18. The vending machine as defined in claim 1 wherein said inner and outer guide tracks and side walls of the storage column receive and guide bottles having flat bottom ends, a tapered neck and a spherically curved main body portion oriented in alternate neck-to-bottom relation in a vertical stack of horizontally disposed bottles in which the spherical curvature of the main body portion of the bottles tends to cause the bottle necks to nose-dive in relation to adjacent bottles in a vertical stack which can cause jamming of the dispensing tray and subsequent inoperativeness of the vending machine and possible breakage of the lowermost beverage bottle.

* * * * *